United States Patent [19]

Lincoln

[11] Patent Number: 5,155,801
[45] Date of Patent: Oct. 13, 1992

[54] CLUSTERED NEURAL NETWORKS

[75] Inventor: William P. Lincoln, Simi Valley, Calif.

[73] Assignee: Hughes Aircraft Company, Los Angeles, Calif.

[21] Appl. No.: 594,458

[22] Filed: Oct. 9, 1990

[51] Int. Cl.[5] ............................................. G06K 9/62
[52] U.S. Cl. ...................................... 395/22; 395/21; 382/14
[58] Field of Search .............. 364/807, 513, 184, 187; 371/36; 395/21, 22

[56] References Cited

U.S. PATENT DOCUMENTS

| | | | |
|---|---|---|---|
| 4,254,474 | 3/1981 | Cooper et al. | 364/900 |
| 4,760,604 | 7/1988 | Cooper et al. | 382/15 |
| 4,884,194 | 11/1989 | Krol et al. | 364/200 |
| 4,907,232 | 3/1990 | Harper et al. | 371/36 |
| 4,941,122 | 7/1990 | Weideman | 364/807 |
| 4,964,126 | 10/1990 | Musicus et al. | 371/36 |
| 4,972,473 | 11/1990 | Ejiri et al. | 380/20 |
| 4,995,040 | 2/1991 | Best et al. | 371/36 |
| 5,060,278 | 10/1991 | Fukumizu | 382/14 |

FOREIGN PATENT DOCUMENTS 1232464 9/1989 Japan .
1260379 10/1989 Japan .

OTHER PUBLICATIONS

Lippmann, R. P., "An Introduction to Computing with Neural Nets", IEEE ASSP Mag., Apr. 1987, pp. 4–22.
Cortes et al., "A Network System for Image Segmentation", I JCNN 1989, pp. I-121–I-125.
Roth, M. W., "Survey of Neural Network Technology for Automatic Target Recognition", IEEE Trans. Neural Network's, vol. 1(1) Mar. 1990, pp. 28–43.
Lee, J., Weger, R. C., "A Hybrid Competitive Learning Backpropagation Network", The Journal of Knowledge Engineering, Spring 1990, pp. 38–43.

Primary Examiner—Michael R. Fleming
Assistant Examiner—Robert W. Doans
Attorney, Agent, or Firm—C. B. Brown; R. M. Heald; W. K. Denson-Low

[57] ABSTRACT

A plurality of neural networks are coupled to an output neural network, or judge network, to form a clustered neural network. Each of the plurality of clustered networks comprises a supervised learning rule back-propagated neural network. Each of the clustered neural networks are trained to perform substantially the same mapping function before they are clustered. Following training, the clustered neural network computes its output by taking an "average" of the outputs of the individual neural networks that make up the cluster. The judge network combines the outputs of the plurality of individual neural networks to provide the output from the entire clustered network. In addition, the output of the judge network may be fed back to each of the individual neural networks and used as a training input thereto, in order to provide for continuous training. The use of the clustered network increases the speed of learning and results in better generalization. In addition, clustering multiple back-propagation networks provides for increased performance and fault tolerance when compared to a single unclustered network having substantially the same computational complexity. The present invention may be used in applications that are amenable to neural network solutions, including control and image processing applications. Clustering of the networks also permits the use of smaller networks and provides for improved performance. The clustering of multiple back-propagation networks provides for synergy that improves the properties of the clustered network over a comparably complex non-clustered network.

8 Claims, 1 Drawing Sheet

CLUSTERED NEURAL NETWORKS

BACKGROUND

The present invention relates generally to neural networks, and more particularly, to a clustered neural network comprising a plurality of supervised learning rule back-propagation neural networks, and to a target detection system for use in a guided missile that employs such clustered neural networks.

One conventional neural network comprises a single back-propagation network. Back-propagation neural networks are generally described in the book entitled "Parallel Distributed Processing (PDP): Exploration in the Microstructure of Cognition," Volume 1, by D. E. Rumelhart, et al., published by MIT Press, Cambridge, Mass. (1986), and specifically at Chapter 8 entitled "Learning Internal Representations by Error Propagation" starting at page 318. The above-mentioned single back-propagation network is a conventional non-clustered neural network described at page 320 in the Rumelhart et al. reference, with specific reference to FIG. 1. Typically, the back-propagation network is unnecessarily large to learn a required task.

With reference to target detection systems for use in missiles, and the like, current systems have not employed neural networks to detect and classify targets located in an image scene.

Therefore, there is a need in the art for a neural network that is relatively small compared to a computationally comparable conventional back-propagation network. Furthermore, there is a need for a clustered neural network that provides for synergy that improves the properties of the clustered network over a comparably complex non-clustered networks. A comparably complex non-clustered network comprises a single back-propagation network having the same number of nodes as the total number of nodes in a clustered neural network. In addition, there is a need for a target detection system for use in a missile that is capable of providing real time target detection and guidance information employing such clustered neural networks.

SUMMARY OF THE INVENTION

The present invention comprises a clustered neural network comprising a plurality of individual supervised learning rule neural networks that are coupled to an output neural network, or judge network. Each of the plurality of networks are trained to perform substantially the same mapping function and are then clustered. The output neural network comprises a judge network that combines the outputs of the plurality of clustered neural networks to generates the output from the entire network. In addition, the output of the judge network may be fed back to each of the plurality of individual networks of the cluster and used as a desired output for use in training.

Each of the plurality of individual neural networks comprise supervised learning rule neural networks, commonly known as back-propagation neural networks. Following training, the clustered neural network computes its output by taking an "average" of the outputs of the individual networks that make up the cluster. This output may be optionally fed back to the network for continuous training.

The use of clusters increases the speed of learning of the overall neural network and provides for better generalization. In addition, the fault tolerance of the overall clustered network is increased. The clustering of multiple back-propagation networks provided by the present invention provides for synergy that improves the properties of the clustered network over a comparably complex non-clustered network.

The present invention may be used in applications that are amenable to neural network solutions, including control and image processing applications. Clustering of the networks permits the use of smaller neural networks and provides improved performance. In particular, the present invention may be employed in a missile target detection and guidance system, for example.

In particular, the present invention comprises a target detection system for use with a missile that incorporates an imaging system and a guidance system that are adapted to detect a target located in an image scene and guide the missile towards the target. The target detection system comprises a segmentor adapted to receive image data from the imaging system and identify regions of the image scene that contain possible targets. The segmentor also provides output signals indicative of possible target images. The system also includes a classifier adapted to process the output signals from the segmentor that are indicative of the possible targets to determine the presence of the target in the image scene. The classifier provides target location signals to the guidance system to direct the missile towards the target.

The classifier comprises the clustered neural network described above, wherein each of the inputs of the clustered neural networks are coupled to receive the output signals from the segmentor, and wherein the output neural network provides an output of the classifier. The classifier provides target location signals to the guidance system of the missile that are indicative of the location of the target to direct the missile towards the target.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
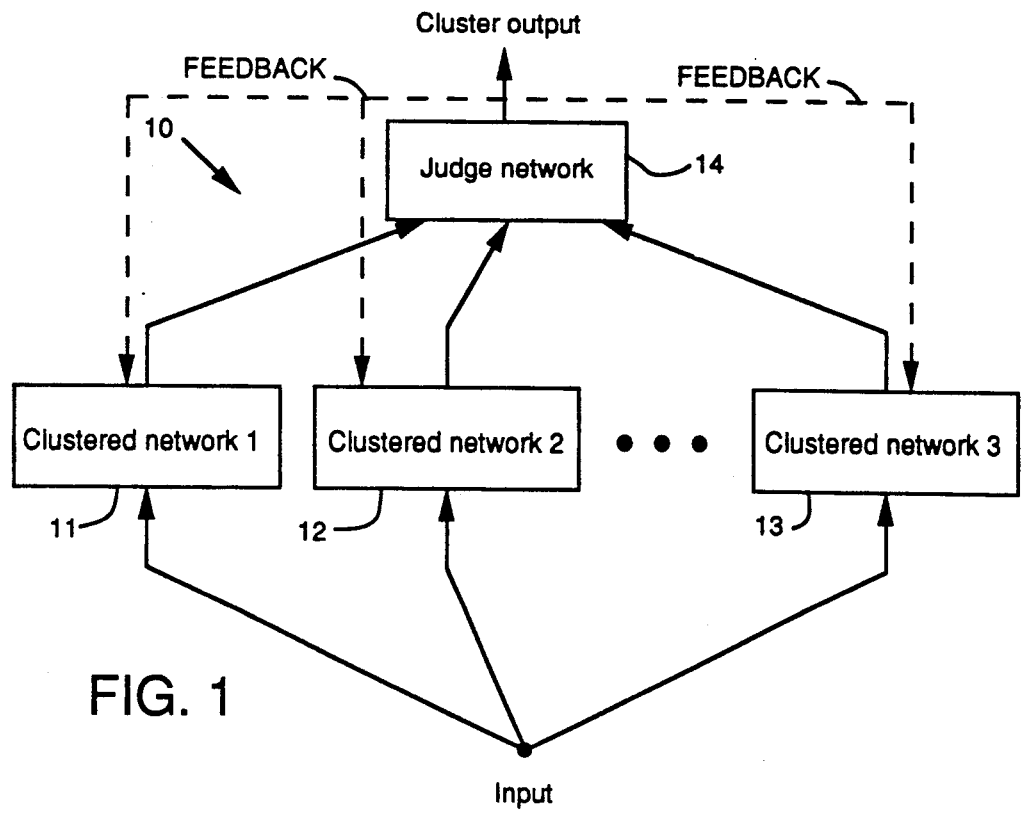
FIG. 1 illustrates a clustered neural network in accordance with the principles of the present invention.

A clustered neural network 10 in accordance with the principles of the present invention is shown in FIG. 1. The clustered neural network 10 comprises a plurality of N individual neural networks 11, 12, 13 whose outputs are coupled to an output neural network, or judge network 14. A typical individual neural network is shown at page 320 of the Rumelhart et al. reference, with reference to FIG. 1. An output neural network is an individual neural network whose inputs are the output of the individual neural networks. Each of the individual neural networks 11, 12, 13 are comprised of supervised, rule-based, back-propagation networks, as they are conventionally known in the art. The formulation of such back-propagation networks is described in "Parallel Distributed Processing (PDP): Exploration in the Microstructure of Cognition," Volume 1, by D. E. Rumelhart et al., MIT Press, Cambridge, Mass., (1986), and this formulation is used for the purposes of this description.

The plurality of individual neural networks 11, 12, 13 are trained to perform substantially the same mapping function. A mapping function may be better understood with reference to "Real Analysis," 3d edition, by H. L. Royden, at page 9. The word "mapping" is often used as a synonym for "function." A mapping function is herein defined as one wherein the output is specified for each possible input in the domain of the function. The back-propagation learning algorithm is not a look-up table. The function that the back-propagation network is trained to do is not usually exactly learned by the network, in that it will learn some parts of the function better than others. Before learning, each of the plurality of neural networks 11, 12, 13 is given a different initial weight so that after learning, the individual ones of the clustered neural networks 11, 12, 13 have different internal representations. The phrase different internal representations means that the individual neural networks are initialized to different random weights. These different initializations cause the individual neural networks to have different final weights. The final weights of an individual neural network are its internal representation. The term "internal representation" is discussed in the Rumelhart et al reference at page 337. An input to the clustered neural network 10 is routed to each of the clustered neural networks 11, 12, 13. Each neural network 11, 12, 13 computes its output, $\hat{y}_k$, and the judge network 14 uses these outputs to form the cluster output, $\hat{y}$. There are many ways of forming $\hat{y}$. For the purposes of this disclosure, $\hat{y}$ is computed in accordance with the equation:

$$\hat{y} = \sum_{k=1}^{N} \frac{1}{N} \hat{y}_k$$

Learning using back-propagation has some pitfalls as is well-known in the art. A network of a given size may not learn a particular mapping function completely or may generalize poorly. Increasing the size and number of hidden layers in the network is often not an improvement as is also known in the art. In accordance with the principles of the present invention, however, by clustering the plurality of neural networks 11, 12, 13 and using the judge network 14 to compute the output of the clustered neural network 10, the processing capability of the resulting network 10 is increased.

In addition, if the output of the judge network 14 is fed back to each of the plurality of individual neural networks 11, 12, 13 and used as the desired output in training, the clustered network 10 becomes fault tolerant in the absence of a teacher. A teacher is an entity that provides the correct output to the networks during training. However, if there is not an initial training period with a perfect teacher, the clustered network 10 collectively self-organizes. Of course, in this case there is no control of the mapping function that the clustered network 10 performs. Simulations have been performed that demonstrate that self-organization occurs, and a discussion of these simulations is presented below.

When a teacher is not present, the output $\hat{y}$ of the judge network 14 is used as the desired output and used to continuously train the individual clustered networks 11, 12, 13. The error that is back-propagated, $d_k = y - \hat{y}_k$, differs from the actual error, $\hat{d}_k = \hat{y} - \hat{y}_k$, that is back-propagated. If $d_k$ and $\hat{d}_k$ differ significantly, the error of the individual neural networks 11, 12, 13, and thus the clustered neural network 10, may increase over time due to the incorrect error term that is back-propagated. This phenomenon is known as drift. Because of the possibility of drift, retraining using $\hat{y}$ as the desired output may seem disadvantageous when no faults exist within the individual neural network 11, 12, 13. However, when it is assumed that faults exist, retraining becomes more advantageous. Furthermore, retraining using $\hat{y}$ adds fault tolerance but causes drift if the individual neural networks 11, 12, 13 did not complete learning prior to the time when the teacher was removed. To remove the teacher means to not provide correct output during training.

If the failure rate of an individual neural network 11, 12, 13 is sufficiently low, an injured network may be retrained using the output of the judge network 14. By incorporating many individual networks 11, 12, 13 in the clustered neural network 10, the effect of an injured network on the output of the clustered network 10 is minimized.

To test the above concepts, an abstract learning problem was analyzed and the results are presented below. This abstract problem was used because many neural network problems require similar separation and classification of a group of topologically equivalent sets in the process of learning. For instance, images are categorized according to their characteristics.

With regard to the abstract learning problem, the input to the clustered neural network 10 is a 3-dimensional point, $P=(x,y,z)$. The problem is to categorize the point P into one of eight sets. The 8 sets are the 8 spheres of radius 1 centered at $(\pm1,\pm1,\pm1)$. The input layer is comprised of three continuous nodes. A node is a unit as shown at page 320 of the Rumelhart et al. reference, with reference to FIG. 1. A continuous node is a node that can take on values or the real number interval between 0 and 1. The size of the output layer is 8, with each node trained to be an indicator function for its associated sphere. One hidden layer was used with full connectivity between layers. Five networks with the above specifications were used to form the clustered neural network 10.

In the first simulation, a comparison of the performance of a single network and the clustered neural network 10 comprising five individual neural networks, when the individual networks are not retrained using $\hat{y}$. The first comparison had 70 nodes in the hidden layer while the second comparison had 15 nodes.

In this case of 70 nodes in the hidden layer, none of the 5 individual networks correctly categorized points from all 8 sets, but at least one network correctly categorized every point. When a network failed to categorize a point, its outputs were all near 0. The judge network correctly categorized all points. Drift was observed and expected since the single networks did not completely learn. Table 1 below indicates the results (c: correctly categorize; x: did not categorize):

TABLE 1

| | Sphere number | | | | | | | |
|---|---|---|---|---|---|---|---|---|
| | 0 | 1 | 2 | 3 | 4 | 5 | 6 | 7 |
| Network 0 | x | c | c | c | x | c | x | c |
| Network 1 | x | x | c | c | c | c | c | c |
| Network 2 | c | x | c | x | c | c | c | x |
| Network 3 | c | x | c | x | c | c | c | x |

TABLE 1-continued

| | Sphere number | | | | | | | |
|---|---|---|---|---|---|---|---|---|
| | 0 | 1 | 2 | 3 | 4 | 5 | 6 | 7 |
| Network 4 | c | x | c | c | c | c | c | x |
| Judge | c | c | c | c | c | c | c | c |

The size of hidden layer was then selected to have 15 nodes. In this case, all 5 networks learned to correctly categorize all 8 sets. The relative errors are shown in Table 2. It can easily be shown that the cluster error is less than or equal to the average of the individual network errors. However, it may not be less than the error of a particular single network.

TABLE 2

| | Errors for pass 2600 | Errors for pass 7000 |
|---|---|---|
| Network 0 | 0.019027 | 0.009096 |
| Network 1 | 0.024747 | 0.009019 |
| Network 2 | 0.012675 | 0.005716 |
| Network 3 | 0.155451 | 0.010024 |
| Network 4 | 0.013121 | 0.004038 |
| cluster | 0.045004 | 0.007579 |

Generalization was tested by using a test point outside the spheres. The error for a representative test point (0, 0, 1) was 1.44530 for the cluster and 1.47521 for a single network. In the next two simulations, a cluster of 5 networks with 15 nodes in the hidden layer is presented.

In the second simulation, the networks are continuously retrained using $\hat{y}$ as the desired output. The errors of the clustered network and of a single network in the cluster are shown in Table 3. In this table, at pass 0 the perfect teacher was removed. The networks in the cluster continued to improve their performance even in the absence of a perfect teacher. This is due to the high degree of learning obtained before the teacher was removed.

TABLE 3

| Pass number | Errors of single network | Errors of clustered network |
|---|---|---|
| 0 | 0.005851 | 0.007492 |
| 2000 | 0.005046 | 0.006838 |
| 4000 | 0.005120 | 0.005178 |
| 10000 | 0.003681 | 0.004946 |
| 15000 | 0.006174 | 0.004892 |
| 20000 | 0.003709 | 0.004410 |
| 25000 | 0.003965 | 0.004529 |
| 30000 | 0.004496 | 0.004761 |

In the third simulation, the fault tolerant capabilities of the clustered neural network 10 is presented. After the plurality of individual networks were trained, a failure rate of 1 link in the cluster per 350 inputs was introduced. This failure rate in terms of a single unclustered network is 1 link per 1750 (=5.350) inputs. The link that is chosen to fail in the cluster was randomly chosen from the links of all the individual networks in the clustered neural network 10. When a link failed its weight was set to 0. The links from the individual networks to the judge network are considered immune from faults in this comparison. Table 4 below shows the results of this simulation. In this table, at pass 0 the first fault was introduced.

TABLE 4

| Pass number | Errors of single unclustered network | Errors of cluster |
|---|---|---|
| 0 | 0.013218 | 0.009366 |
| 2000 | 0.056791 | 0.016781 |
| 4000 | 0.162777 | 0.021286 |
| 10000 | 0.397710 | 0.018881 |
| 15000 | 0.643889 | 0.041013 |
| 20000 | 1.160531 | 0.043853 |
| 25000 | 1.428179 | 0.059557 |
| 30000 | 1.552970 | 0.067481 |

In summary, clustering of multiple back-propagation neural networks increases the performance and fault tolerance of the clustered network over a single network having substantially the same computational complexity. It is to be understood that the clustering concepts of the present invention are not specific to back-propagation type neural networks, and may be applied to any networks trained with a supervised learning rule.

The present invention may be used in applications that are amenable to neural network solutions, including control and image processing applications. Clustering of the networks permits the use of smaller neural networks and provides improved performance. In particular, the present invention may be employed in a missile target detection and guidance system, for example. Such a missile target detection system is illustrated in FIG. 2.

Figure 2:
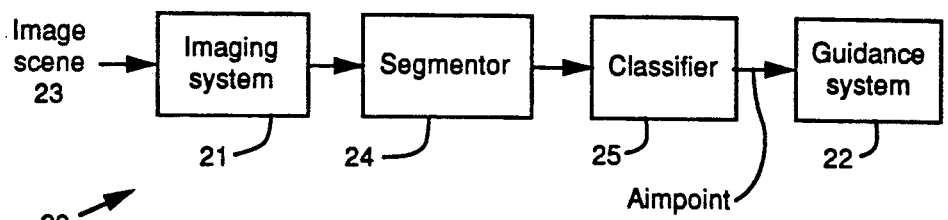
FIG. 2 illustrates a target detection system that may be employed in a missile guidance system, for example, that incorporates the clustered neural network of FIG. 1.

With reference to FIG. 2, a target detection system 20 for use with a missile that incorporates an imaging system 21 and a guidance system 22 that are adapted to detect a target located in an image scene 23 and guide the missile towards the target. The target detection system 20 comprises a segmentor 24 adapted to receive image data from the imaging system 21 and identify regions of the image scene 23 that contain possible targets. The segmentor 24 also provides output signals indicative of possible target images. The segmentor is adapted to process image data to segment the image into those areas that contain potential targets. Segmentors are well-known in the image processing art and will not be described in detail herein. Typical segmentors that may be adapted for use in the present system 20 are discussed in detail in a textbook entitled "Pattern Classification in Scene Analysis," by Duda and Hart.

The system 20 also includes a classifier 25 adapted to process the output signals from the segmentor 24 that are indicative of the possible targets to determine the presence of the target in the image scene 23. The classifier 25 provides target location or aimpoint signals 26 to the guidance system 22 to direct the missile towards the target.

The classifier 25 comprises the clustered neural network 10 described with reference to FIG. 1, wherein each of the inputs of the clustered neural networks 11, 12, 13 are coupled to receive the output signals from the segmentor 21, and wherein the output neural network 14 provides an output of the classifier 25. The classifier 25 provides target location signals to the guidance system 22 of the missile that are indicative of the location of the target to direct the missile towards the target.

The system 20 operates as follows. An image scene 23 having a tank in it is segmented into candidate objects that are about the same size as a tank by the segmentor 24. The segmented candidate objects may be a tank, a truch, a large rock or some other similarly sized object. The segmented objects are processed by the classifier 25 to determine if they are tanks or not. Each of the back-propagation neural networks processes the segmented image data to identify if one of the segmented objects is a tank. If a tank is identified by the classifier 25, then aimpoint information, such as target centroid data is provided to the missile guidance system 22 that allows it to guide the missile toward the identified target.

Thus there has been described a new and improved clustered neural network comprising a clustered plurality of back-propagation neural networks, and a target detection system for use with a missile guidance system that employs such clustered neural networks. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A clustered neural network architecture comprising:
   (A) a plurality of individual neural networks, each neural network having an input and an output, wherein each of the inputs are connected in common, and each neural network comprising:
      (a) means for receiving initial weights that are different from initial weights of others of the plurality of neural networks;
      (b) means for training the neural network to implement a mapping function using the received initial weights, the mapping function being the same for all of the plurality of neural networks; and
      (c) means for performing the mapping function in a different way than the other networks of the plurality of neural networks; and
   (B) an output neural network having a plurality of inputs and a single output that provides an output of the clustered neural network, and wherein the respective outputs of the plurality of individual neural networks are individually coupled to the respective plurality of inputs of the output neural network.

2. The neural network architecture of claim 1 wherein each of the respective plurality of individual neural networks comprises a supervised, rule-based, back-propagation neural network.

3. The neural network architecture of claim 2 wherein the output of the output neural network is coupled to each of the respective plurality of neural networks.

4. The neural network architecture of claim 1 wherein the output of the output neural network is coupled to each of the respective plurality of neural networks.

5. A target detection system for use with a missile that incorporates an imaging system and a guidance system that are adapted to detect a target located in an image scene and guide the missile towards the target, said target detection system comprising:
   a segmentor adapted to receive image data from the imaging system for identifying regions of the image scene that contain possible targets, and for providing output signals indicative of possible target images; and
   a classifier adapted to process the output signals indicative of the possible targets provided by the segmentor to determine the presence of a target in the image scene and provide target location signals to the guidance system to direct the missile towards the target, said classifier comprising:
      (A) a plurality of individual neural networks, each neural network having an input and an output, wherein each of the inputs are connected in common and are coupled to receive the output signals from the segmentor, and each neural network comprising:
         (a) means for receiving initial weights that are different from initial weights of others of the plurality of neural networks;
         (b) means for training the neural network to implement a mapping function using the received initial weights, the mapping function being the same for all the plurality of neural networks; and
         (c) means for performing the mapping function in a different way that the other networks of the plurality of neural networks; and
      (B) an output neural network having a plurality of inputs and a single output that provides an output of the classifier, and wherein the respective outputs of the plurality of individual neural networks are individually coupled to the respective plurality of inputs of the output neural network;
   the classifier providing target location signals to the guidance system of the missile that are indicative of the location of the target to direct the missile towards the target.

6. The target detection system of claim 5 wherein each of the respective plurality of individual neural networks comprises a supervised, rule-based, back-propagation neural network.

7. The target detection system of claim 6 wherein the output of the output neural network is coupled to each of the respective plurality of neural networks.

8. The target detection system of claim 5 wherein the output of the output neural network is coupled to each of the respective plurality of neural networks.

* * * * *